(12) United States Patent
Miyazaki (10) Patent No.: US 7,928,661 B2
(45) Date of Patent: Apr. 19, 2011

(54) SELF-EXCITED INVERTER DRIVING CIRCUIT

(75) Inventor: Hiroyuki Miyazaki, Tokyo (JP)

(73) Assignee: Sumida Corporation, Tokyo (JP)

( * ) Notice: Subject to any disclaimer, the term of this patent is extended or adjusted under 35 U.S.C. 154(b) by 652 days.

(21) Appl. No.: 11/989,015

(22) PCT Filed: Jun. 28, 2006

(86) PCT No.: PCT/JP2006/312861
§ 371 (c)(1),
(2), (4) Date: Jan. 18, 2008

(87) PCT Pub. No.: WO2004/010718
PCT Pub. Date: Jan. 25, 2007

(65) Prior Publication Data
US 2009/0195177 A1 Aug. 6, 2009

(30) Foreign Application Priority Data
Jul. 20, 2005 (JP) .................................. 2005-210624

(51) Int. Cl.
*H05B 37/00* (2006.01)

(52) U.S. Cl. ......... 315/219; 315/276; 315/307; 315/308

(58) Field of Classification Search .................. 315/224, 315/219, 291, 307, 308, DIG. 5, DIG. 7, 315/276, 277, 279
See application file for complete search history.

(56) References Cited

U.S. PATENT DOCUMENTS
2004/0239260 A1* 12/2004 Nakano ........................ 315/246

FOREIGN PATENT DOCUMENTS
| JP | U 05-072096 | 9/1993 |
| JP | U 06-074089 | 10/1994 |
| JP | A 08-033353 | 2/1996 |
| JP | A 2002-175891 | 6/2002 |
| JP | A 2004-350444 | 12/2004 |

* cited by examiner

*Primary Examiner* — David Hung Vu
(74) *Attorney, Agent, or Firm* — Oliff & Berridge, PLC (57) ABSTRACT

To provide a low-cost self-excited inverter driving circuit exhibiting an excellent operational efficiency. A main inverter section is so constructed that a part of output signals is fed back by a resonance loop circuit to cause a self-excited oscillation to occur in the vicinity of a resonance frequency decided by leakage inductors and capacitors on the secondary side of a high voltage transformer, thereby performing an inverter operation. It is further arranged that a halt interval setting signal, which is generated by a triangular wave forming circuit and a control section, is applied to the main inverter section, thereby halting the inverter operation in accordance with the halt interval setting signal.

8 Claims, 5 Drawing Sheets

SELF-EXCITED INVERTER DRIVING CIRCUIT

TECHNICAL FIELD

The present invention relates to a self-excited inverter driving circuit, and for example, to a driving circuit for a backlight discharge lamp in a liquid crystal display panel.

BACKGROUND ART

Various conventional liquid crystal display panels for use in, for example, laptop computers have a backlight using a plurality of cold cathode fluorescent lamps (hereinafter referred to as CCFLs).

An inverter driving circuit is normally used to light such CCFLs. The inverter driving circuit is classified into an external-excited inverter driving circuit in which an inductor and a capacitor on a secondary side of a transformer form a resonance circuit and in which a dedicated IC is used to drive the lamps in the vicinity of a resonance point of the resonance circuit and a self-excited inverter driving circuit in which a Royer circuit or the like is used to form a voltage resonance circuit on a primary side of the transformer. Various circuits of the respective types have been proposed (see, for example, Patent Documents 1 and 2).

Patent Document 1: Japanese Unexamined Patent Publication No. 2004-350444
Patent Document 2: Japanese Unexamined Patent Publication No. 2002-175891

DISCLOSURE OF THE INVENTION

Problems to be Solved by the Invention

The external-excited driving circuit is advantageously very efficient because of the use of a secondary resonance operation of the transformer. However, the external-excited driving circuit uses the dedicated IC to control the entire operation, disadvantageously resulting in high costs.

On the other hand, the self-excited driving circuit can be composed of general-purpose electronic components without using any dedicated IC as in the case of the external-excited driving circuit. Thus, the self-excited driving circuit is advantageously more inexpensive than the external-excited driving circuit. However, the self-excited driving circuit disadvantageously operates inefficiently because of a primary resonance operation of the transformer.

The present invention is made in view of these circumstances. An object of the present invention is to provide a self-excited inverter driving circuit having both the advantage of being able to be relatively inexpensively constructed using general-purpose electronic components as in the case of the conventional self-excited driving circuit and the advantage of being able to operate efficiently as in the conventional external-excited driving circuit.

Means for Solving the Problems

A self-excited inverter driving circuit in accordance with the present invention is a self-excited inverter driving circuit that drives a discharge tube, characterized in that an output voltage of a resonance frequency of a resonance circuit comprising a leakage inductor and a capacitor on a secondary side of a high voltage transformer is fed back to a switching element for self-excited oscillation.

This configuration preferably has a resonance loop circuit configured so as to convert a secondary output of the high voltage transformer into a pulse signal of a fixed voltage and feeding back the signal to an input side.

Furthermore, the self-excited inverter driving circuit preferably has a triangular wave forming circuit that transforms the secondary output of the high voltage transformer into full-wave rectification to generate a pseudo triangular wave signal and a control section which compares an output from the triangular wave forming circuit with a DC reference voltage proportional to a peak value of the output from the triangular wave forming circuit and which generates a halt interval setting signal that halts an inverter operation for a predetermined interval on the basis of a result of the comparison.

Furthermore, the control section is preferably configured to use a shunt regulator or a comparator to provide a DC voltage proportional to the peak value of the pseudo triangular wave signal.

Moreover, preferably, the high voltage transformer has two secondary windings, and the resonance loop circuit is configured so that a Zener diode converts a part of an AC output provided by each of the secondary windings into a pulse signal of a fixed voltage, and the triangular wave forming circuit is configured to transform a part of the AC output provided by each of the secondary windings into half-wave rectification and to synthesize the half-wave rectification outputs to provide a full-wave rectification output.

Moreover, a self-excited inverter driving circuit in accordance with the present invention is a self-excited inverter driving circuit comprising a plurality of switching circuits that perform a switching operation to generate an AC signal and a high voltage transformer connected to the switching circuits, an output terminal of the high voltage transformer being connected to discharge lamps, characterized in that:

the high voltage transformer has two secondary windings, and the discharge lamps are connected to high voltage side terminals of the two secondary windings, and the self-excited inverter driving circuit comprises a feedback section located on a low voltage side of a capacitor connected in parallel with the discharge lamps to feed back an output voltage of a secondary resonance frequency, and controls switching operations of the switching circuits on the basis of the secondary resonance frequency of the fed-back output voltage.

Furthermore, preferably, a rectifying circuit to form a triangular wave that is connected to a low voltage side terminal of the secondary winding in the high voltage transformer, and the rectifying circuit forms the triangular wave of the secondary resonance frequency, compares a signal level of the triangular wave with a signal level of the output voltage, and on the basis of a result of the comparison, sets a halt interval for the switching circuit.

Moreover, the self-excited inverter driving circuit preferably has at most two comparators that compare the triangular wave with the output voltage.

Furthermore, a self-excited inverter driving circuit in accordance with the present invention is a self-excited inverter driving circuit having a resonance circuit comprising a leakage inductance and a capacitance of a high voltage transformer and providing a resonance frequency at which a discharge lamp is driven, characterized by setting a halt interval for a switching circuit located on a primary side of the high voltage transformer on the basis of a triangular wave output from a low voltage side of a secondary winding in the high voltage transformer and an output voltage fed from a low voltage side of a capacitor connected in parallel with the discharge lamp, back to a primary side of the high voltage transformer.

EFFECT OF THE INVENTION

According to the self-excited inverter driving circuit of the present invention, the configuration oscillating in the vicinity of the resonance frequency provided by the resonance circuit comprising the leakage inductor and capacitor on the secondary side of the high voltage transformer is applied to the self-excited inverter driving circuit. The self-excited inverter driving circuit thus has both the advantage of being able to be relatively inexpensively constructed using general-purpose electronic components as in the case of the self-excited driving circuit and the advantage of being able to operate efficiently as in the external-excited driving circuit. The conventional art does not have the idea of the application, to the self-excited driving circuit, of the characteristic configuration of the external-excited driving circuit which oscillates in the vicinity of the resonance frequency provided by the resonance circuit comprising the leakage inductor and capacitor on the secondary side of the high voltage transformer. The present inventor has obtained this idea by looking at the related techniques from a different angle.

Furthermore, specifically, the self-excited inverter driving circuit is configured to convert the secondary output from the high voltage transformer into the pulse signal and to feed back the signal to the input side. This provides an inverter operation based on self-excited oscillation, enabling more efficient operations. Furthermore, oscillation can be achieved without the need for a circuit that controls the power to a MOSFET that performs a switching operation. This enables a reduction in costs.

Moreover, the triangular wave is generated, in a pseudo manner, from a part of the secondary output from the high voltage transformer. The triangular wave is compared with the predetermined voltage to obtain the signal setting the halt interval for the inverter operation so that the inverter operation can be halted at predetermined intervals in accordance with the halt interval setting signal. This makes it possible to provide a relatively inexpensive PWM-driving self-excited inverter driving circuit without the need for a dedicated IC, which is required for the conventional techniques.

BRIEF DESCRIPTION OF THE DRAWINGS

FIG. 5 is a signal waveform diagram of signals from main sections of the self-excited inverter driving circuit in accordance with the embodiment of the present invention, wherein FIGS. 5(a) and 5(b) are waveform diagrams of output signals from a resonance loop circuit, FIG. 5(c) is a waveform diagram of an output signal from a triangular wave forming circuit, and FIG. 5(d) shows logical values of a halt interval setting signal.

DESCRIPTION OF SYMBOLS

1 High voltage transformer
61, 63 Pre-drivers
62, 64, 62A, 64A MOS FETs
71, 73 Comparators
72 Shunt regulator
101 Main inverter section
102 Resonance loop circuit
103 Triangular wave forming circuit
104 Control section

BEST MODE FOR CARRYING OUT THE INVENTION

With reference to FIGS. 1 to 5, description will be given of a self-excited inverter driving circuit in accordance with an embodiment of the present invention.

First, with reference to the diagram of a basic configuration shown in FIG. 1, description will be given of a basic configuration of the self-excited inverter driving circuit in accordance with an embodiment of the present invention.

The self-excited inverter driving circuit in accordance with the embodiment of the present invention is roughly composed of a main inverter section 101, a resonance loop circuit 102, a triangular wave forming circuit 103, and a control section 104.

Figure 1:
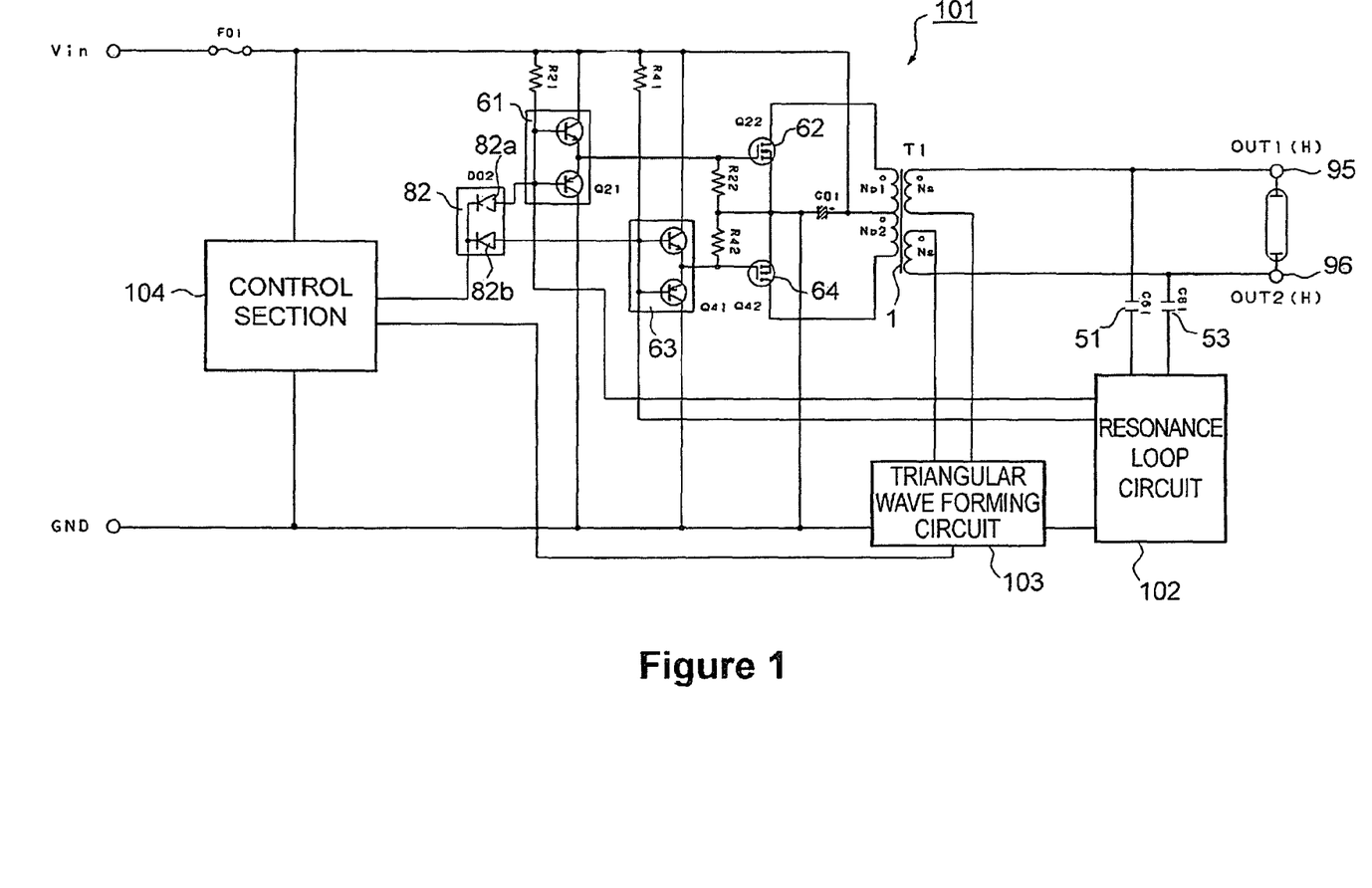
FIG. 1 is a diagram showing an example of a basic circuit configuration of a self-excited inverter driving circuit in accordance with an embodiment of the present invention.

The main inverter section 101, shown in FIG. 1, has a high voltage transformer (T1) 1, two MOS FETs (Q22 and Q42) 62 and 64, and pre-drivers (Q21 and Q41) 61 and 63 as main components. The main inverter section 101 generates a high-frequency high voltage on the basis of a DC input voltage Vin. The configuration of the main inverter section 101 is well known for a circuit of this kind.

The two MOS FETs (Q22 and Q42) 62 and 64 are connected together so as to perform a push-pull operation on a primary side of the high voltage transformer 1. What is called the pre-drivers (Q21 and Q41) 61 and 63 are connected to gates of the MOS FETs (Q22 and Q42) 62 and 64. Each of the pre-drivers 61 and 63 has what is called a totem pole circuit composed of an npn-type transistor and a pnp-type transistor. A signal from the control section 104 and a signal from the resonance loop circuit 102 are applied to bases of the pre-drivers 61 and 63, respectively, as described below.

Thus, the two MOS FETs 62 and 64 are driven via the pre-drivers 61 and 63 to provide a desired high voltage on the secondary side of the high voltage transformer (this will be described below in detail).

The high voltage transformer 1 has two secondary high voltage windings wound in the opposite directions. Thus, voltages induced in the respective windings have phases differing from each other by 180°. Winding starts (shown by circles in FIG. 1) of the secondary high voltage windings are connected to output terminals (OUT1 and OUT2) 95 and 96, respectively. For example, U tubes, straight tubes, or what is called pseudo U tubes may be connected to the two output terminals 95 and 96.

The resonance loop circuit 102 feeds back outputs so that the main inverter section 101 operates in the vicinity of a resonance frequency determined by a leakage inductor and a capacitance component on the secondary side of the high voltage transformer 1.

The triangular wave forming circuit 103 generates triangular waves. In the embodiment of the present invention, pseudo triangular waves are generated and output from the secondary output of the high voltage transformer 1 (this will be described below in detail).

An output signal from the triangular wave forming circuit 103 is applied to the control section 104. The control section 104 outputs a halt interval setting signal to the main inverter section 101, the signal setting halt intervals for the two MOS FETs 62 and 64 of the main inverter section 101 (this will be described below in detail).

A more specific circuit configuration will be described below.

First, a first example of a specific circuit configuration will be described with reference to FIG. 2. The same components as those shown in FIG. 1 are denoted by the same reference numerals and will not be described below.

First, the resonance loop circuit 102 has two Zener diodes (ZD61 and ZD81) 91 and 92.

That is, anodes of the two Zener diodes 91 and 92 (ZD61 and ZD81) are connected to the ground. A cathode of the Zener diode (ZD61) 91 is connected to a capacitor (C61) 51 and to the first output terminal (OUT1) 95 via the capacitor (C61) 51.

A cathode of the other Zener diode (ZD81) 92 is connected to a capacitor (C81) 53 and to the second output terminal (OUT2) 96 via a capacitor (C81) 53.

The cathode of the Zener diode (ZD61) 91 is also connected to an input end of the pre-driver (Q41) 63, that is, bases of the npn transistor and the pnp transistor, and to the anode of the diode 82a being one of two diodes 82a and 82b constituting a pair diode (D02) 82.

Moreover, a cathode of the Zener diode (ZD81) 92 is connected to an input end of the pre-driver (Q21) 61, that is, to the bases of the npn transistor and the pnp transistor constituting the pre-driver (Q21) 61, and also connected to an anode of one of the two diodes 82a and 82b constituting the pair diode (D02) 82, that is, the diode 82b.

In the resonance loop circuit 102 configured as described above, the secondary voltage of the high voltage transformer 1 is converted into a fixed voltage by the Zener diodes 91 and 92. The resultant voltage is applied to an input side of the main inverter section 101.

Thus, a feedback lop is formed between the input and output of the main inverter section 101 via the resonance loop circuit 102. This causes self-excited oscillation in the vicinity of a resonance frequency determined by the leakage inductance L of the secondary winding in the high voltage transformer 1 and the secondary capacitor component of the high voltage transformer 1.

Consequently, the output of the resonance loop circuit 102, that is, the cathodes of the Zener diodes 91 and 92, provide a square wave pulse voltage having a phase difference of 180° and a repeated frequency in the vicinity of the above-described resonance frequency as shown in FIGS. 5(a) and 5(b).

The main secondary capacitive component of the high voltage transformer 1 is capacitors (C61 and C81) 51 and 53.

Now, the triangular wave forming circuit 103 will be described.

The triangular wave forming circuit 103 in accordance with the present invention has a pair diode (D03) 83, two resistors (R62 and R82) 32 and 34, and two capacitors (C62 and C82) 52 and 54.

The pair diode (D03) 83 is made up of two diodes 83a and 83b provided in one package. Cathodes of the diodes 83a and 83b are connected together and to an input stage of the control section 104, described below.

Furthermore, an anode of the diode 83a of the pair diode (D03) 83 is connected to a winding end of one of the two secondary windings in the high voltage transformer 1, the secondary winding to which the first output terminal (OUT1) 95 is connected. Moreover, an anode of the other diode 83b is similarly connected to a winding end of the secondary winding of the high voltage transformer 1 connected to the second output terminal (OUT2) 96.

Furthermore, one end of each of the capacitor (C62) 52 and the resistor (R62) 32 is connected to the anode of the diode 83a. The other end of each of the capacitor (C62) 52 and the resistor (R62) 32 is connected to the ground.

Likewise, one end of each of the capacitor (C82) 54 and the resistor (R82) 34 is connected to the other anode of the diode 83b. The other end of each of the capacitor (C82) 54 and the resistor (R82) 34 is connected to the ground.

In the triangular wave forming circuit 103, each of the two diodes 83a and 83b performs half-wave rectification, and rectification outputs from the diodes 83a and 83b are added together on the cathode side to provide a full-wave rectification output as shown in FIG. 5(c). Each peak point of the full-wave rectification output wave almost coincides with a rising edge or a falling edge of a square wave pulse signal provided by the above-described resonance loop circuit 102.

In the embodiment of the present invention, the full-wave rectification wave is considered to be a dull rising or falling edge of a triangular wave, in other words, a pseudo triangular wave, and is input to the control section 104, described below.

Now, the control section 104 will be described. The control section 104 has a comparator (IC01) 71 and a shunt regulator (IC02) 72 as main components. The control section 104 is configured to output signals controlling driving of the main inverter section 101 in accordance with outputs from the triangular wave forming circuit 103, described above (this will be described below in detail).

A specific circuit configuration will be described below.

A predetermined voltage obtained by dividing an input voltage Vin by resistors (R02, R03, and R04) 2 to 4 is applied to a non-inversion input terminal of the comparator (IC01) 71. The three resistors (R02, R03, and R04) 2 to 4 are connected in series between the ground and a line through which the input voltage Vin is applied. The connection point between the resistors (R03) 3 and (R04) 4 is connected to the non-inversion input terminal of the comparator (IC01) 71. A feedback resistor (R06) 6 is connected between the non-inversion input terminal and an output terminal of the comparator (IC01) 71 to provide a comparing operation as described below.

The output terminal of the comparator (IC01) 71 is connected to a cathode of the pair diode (D02) 82. The two diodes 82a and 82b, constituting the pair diode 82, are connected to input sides of the corresponding pre-drivers (Q21 and Q41) 61 and 63 of the main inverter section 101.

Furthermore, the cathode of the pair diode (D03) 83 in the triangular wave forming circuit 103 is connected to an inversion input terminal of the comparator (IC01) 71 via a resistor (R10) 10.

Moreover, the inversion input terminal of the comparator (IC01) 71 is connected to the ground via a resistor (R07) 7.

Furthermore, the diode (D01) 81, a resistor (R08) 8, and a resistor (R09) 9 are connected in series, in order from the resistor (R10) 10, between the ground and a triangular wave forming circuit 103-side end of the resistor (R10) 10 connected to the inversion input terminal of the comparator (IC01) 71. Moreover, a capacitor (C04) 44 is connected in parallel with the resistor (R09) 9.

On the other hand, the shunt regulator (IC02) 72 has an anode connected to the ground and a cathode connected to the connection point between the resistor (R02) 2 and the resistor (R03) 3.

The connection point between the resistor (R08) 8 and the resistor (R09) 9 is connected to a reference of the shunt regulator (IC02) 72.

In the control section 104 configured as described above, a pseudo triangular wave (see FIG. 5(c)) from the triangular wave forming circuit 103 which is applied to the inversion input terminal has the peak value thereof fixed by the diode (D01) 81, the resistors (R08) 8 and (R09) 9, and the shunt regulator (IC02) 72.

That is, an output signal from the triangular wave forming circuit 103 is applied to the inversion input terminal of the comparator (IC01) 71 and to the reference terminal of the shunt regulator (IC02) 72 via the diode (D01) 81 and the resistor (R08) 8. The shunt regulator (IC02) 72 operates to fix the voltage of the reference terminal. As a result, the cathode voltage varies depending on the voltage of the reference terminal. Here, for example, it is assumed that the shunt regulator has a reference of 2.5 V. Then, if the value of a voltage obtained by smoothing the pseudo triangular wave signal by the resistor (R08) 8 and the capacitor (C04) 44 is greater than 2.5 V, the cathode voltage of the shunt regulator (IC02) 72 decreases. This reduces the voltage of the non-inversion input terminal of the comparator (IC01) 71 to increase a halt interval for the two MOS FETs 62 and 64 of the main inverter section 101 determined by a halt interval setting signal output by the control section 104. As a result, the secondary voltage of the high voltage transformer (T1) 1 decreases.

On the other hand, if the value of the voltage obtained by smoothing the pseudo triangular wave signal by the resistor (R08) 8 and the capacitor (C04) 44 is smaller than 2.5 V, the cathode voltage of the shunt regulator (IC02) 72 rises as opposed to the above-described case. This increases the voltage of the non-inversion input terminal of the comparator (IC01) 71 to reduce the halt interval. As a result, the secondary voltage of the high voltage transformer (T1) 1 increases.

Such a circuit operation using the shunt regulator (IC02) 72 enables an operation of keeping the secondary voltage of the high voltage transformer (T1) 1 fixed.

Thus, when the voltage of the pseudo triangular wave signal from the triangular wave forming circuit 103 which is applied to the anode of the diode (D01) 81 becomes higher than the voltage of the cathode side of the diode (D01) 81 by a predetermined amount sufficient to make the diode (D01) 81 conductive, the diode (D01) 81 becomes conductive. Consequently, the reference terminal of the shunt regulator (IC02) 72 is fixed at 2.5 V to keep the peak value of the pseudo triangular wave signal fixed. Since the cathode voltage of the diode (D01) 81 is applied to the reference terminal of the shunt regulator (IC02) 72 via the resistor (R08) 8 as described above, the cathode voltage of the shunt regulator (IC02) 72 is inversely proportional to the peak value of the pseudo triangular wave signal. This means that a reference voltage for the non-inversion input terminal of the comparator (IC01) 71 is inversely proportional to the peak value of the pseudo triangular wave signal.

In the comparator (IC01) 71, the output signal from the triangular wave forming circuit 103, which has the fixed peak value as described above, is applied to the inversion input terminal and compared with the reference voltage for the non-inversion input terminal (see a two-dot chain line in FIG. 5(c)). As a result, while the output signal from the triangular wave forming circuit 103 exceeds the reference voltage for the non-inversion input terminal, an output from the comparator (IC01) 71 is at a level corresponding to a logical value Low. In the other intervals, the output from the comparator (IC01) 71 is at a level corresponding to a logical value High. That is, the comparator (IC01) 71 outputs a square wave pulse signal corresponding to the result of the comparison between the output signal from the triangular wave forming circuit 103 and the reference voltage for the comparator (IC01) 71, as the halt interval setting signal for the main inverter section 101.

FIG. 5(d) shows a halt interval setting signal (the above-described square wave pulse signal) showing a logical value indicating whether the halt interval setting has an ON status (High status) or an OFF status (Low status). The High status and Low status of the halt interval setting signal are reverse to the High status and Low status of the output value from the comparator (IC01) 71.

When the halt interval setting signal from the comparator (IC01) 71 is applied to the pair diode (D02) 82, if the halt interval setting signal is at the level corresponding to the logical value High (the output value from the comparator (IC01) 71 has the Low status), the pair diode (D02) 82 is conductive, and the base sides of the pre-drivers (Q21 and Q41) 61 and 63 are at the level corresponding to the logical value Low. Thus, the transistors in the pre-drivers (Q21 and Q41) 61 and 63 are conductive, and the gate sides of the MOS FETs (Q22 and Q42) 62 and 64 have the logical value Low. Thus, in the meantime, the MOS FETs (Q22 and Q42) are inoperative (see FIG. 5).

On the other hand, when the halt interval setting signal output by the comparator (IC01) 71 is at the level corresponding to the logical value Low (the output value from the comparator (IC01) 71 has the High status), the pair diode (D02) 82 is nonconductive. Thus, in the meantime, the output signal (see FIGS. 5(a) and 5(b)) from the resonance loop circuit 102 which is at the level corresponding to the logical value High keeps the transistors in the pre-drivers (Q21 and Q41) 61 and 63 nonconductive. The MOS FETs (Q22 and Q42) 62 and 64 are operative.

Now, description will be given of the general operation of the self-excited inverter driving circuit in accordance with the embodiment of the present invention configured as described above.

Application of the voltage Vin allows the main inverter section 101 to generate a high AC voltage on the secondary side of the high voltage transformer 1. However, since a part of the output voltage is fed back to the input side of the main inverter section 101 via the resonance loop circuit 102 (see FIGS. 5(a) and 5(b)), the AC voltage is generated by self-excited oscillation in the vicinity of a predetermined resonance point. The predetermined resonance point is determined by the secondary leakage inductor and capacitive component of the high voltage transformer 1.

In the embodiment of the present invention, the triangular wave forming circuit 103 is connected to the secondary side of the high voltage transformer 1. A full-wave rectification signal as a pseudo triangular wave signal is generated from the secondary voltage of the high voltage transformer 1. The control section 104 compares the full-wave rectification signal with the predetermined reference voltage (see FIG. 5(c)).

The control section 104 performs the comparing operation to generate a halt interval setting signal for halting self-excited oscillation of the main inverter section 101 (see FIG. 5(d)).

Figure 5:
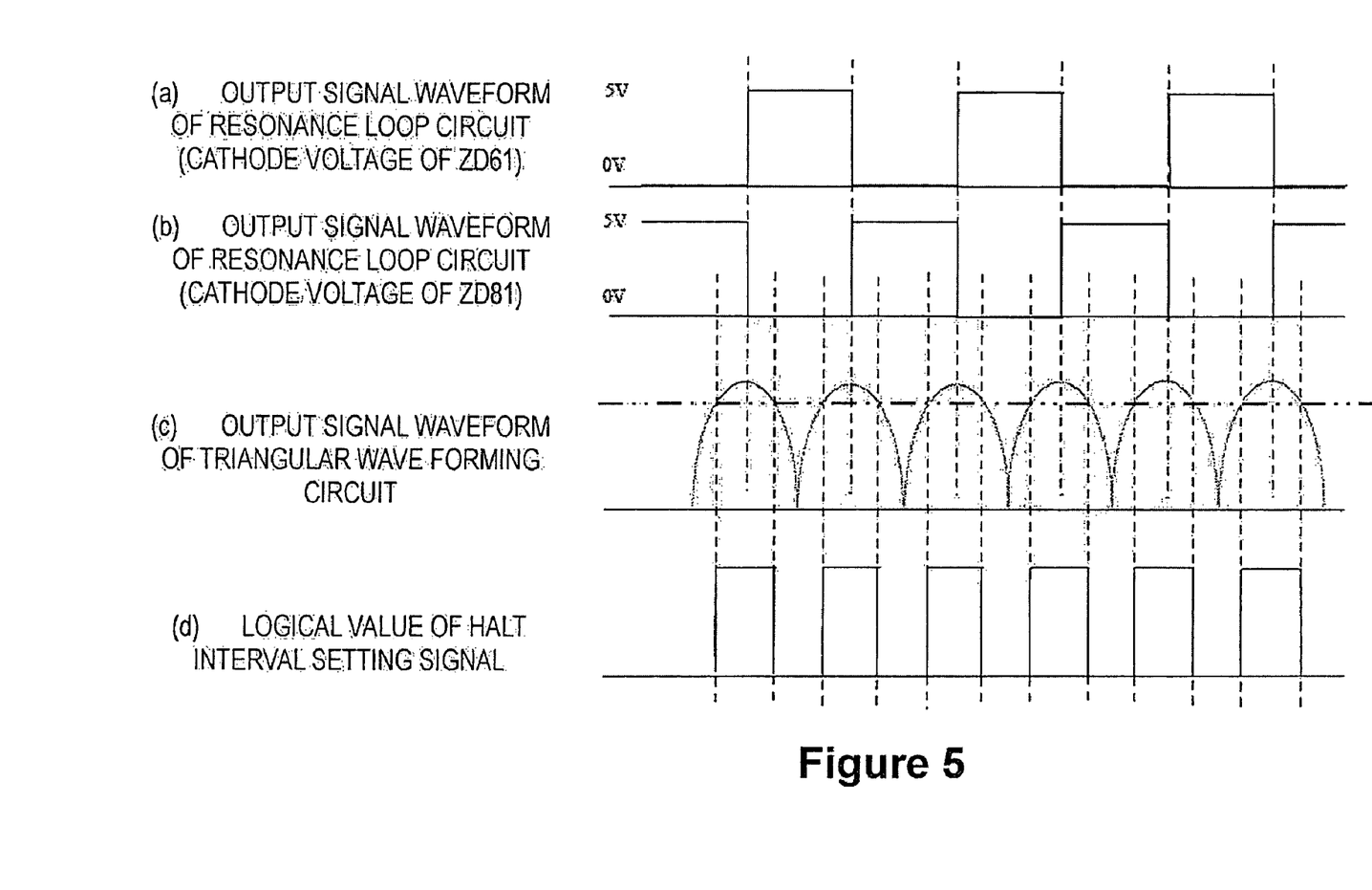

As a result, the main inverter section 101 is driven only during an interval (see FIG. 5(d)) in which the square wave pulse signal (see FIGS. 5(*a*) and 5(*b*)) applied to the pre-drivers (Q21 and Q41) 61 and 63 by the resonance loop circuit 102 is at the level corresponding to the logical value High and in which the halt interval setting signal applied to the pre-drivers (Q21 and Q41) 61 and 63 by the control section 104 via the pair diode (D02) 82 is at the level corresponding to the logical value Low. In other words, the main inverter section 101 is subjected to PWM driving based on self-excited oscillation caused by the resonance loop circuit 102. The PWM driving interval can be optionally set by the triangular wave forming circuit 103 and the control section 104.

In the embodiment of the present invention, since the reference voltage for the comparator (IC01) 71 is fixed, the halt interval setting signal output by the control section 104 has the fixed pulse width. However, when the circuit is configured to vary the reference voltage, the pulse width of the halt interval setting signal can be optionally set at a desired value. The PWM driving interval for the main inverter section 101 can thus be varied.

In the embodiment of the present invention, the control section 104 uses the shunt regulator (IC02) 72 to fix the peak value of the output from the triangular wave forming circuit 103 applied to the comparator (IC01) 71 and to make the reference voltage for the comparator (IC01) 71 proportional to the output peak value of the triangular wave forming circuit 103. This makes it possible to stabilize output voltages from the output terminals 95 and 96 and to set an open-circuit voltage for the output terminals 95 and 96. That is, as previously described, when the reference voltage for the comparator (IC01) 71 is variable, the pulse width of the halt interval setting signal is also variable. This makes the driving period of the main inverter section 101 variable, allowing the open-circuit voltage to be set at a desired value.

Now, a second example of a configuration will be described with reference to FIG. 3. The same components as those shown in FIGS. 1 and 2 are denoted by the same reference numerals and will not be described in detail. The description below focuses on differences from the first example.

In the second configuration example, the circuit configuration of the control section 104 is changed. The other circuit configurations are basically the same as those in the configuration example shown in FIG. 2. FIG. 3 shows only the circuit configuration of the control section 104. The control section 104 in the third configuration example will be described with reference to FIG. 3.

Figure 2:
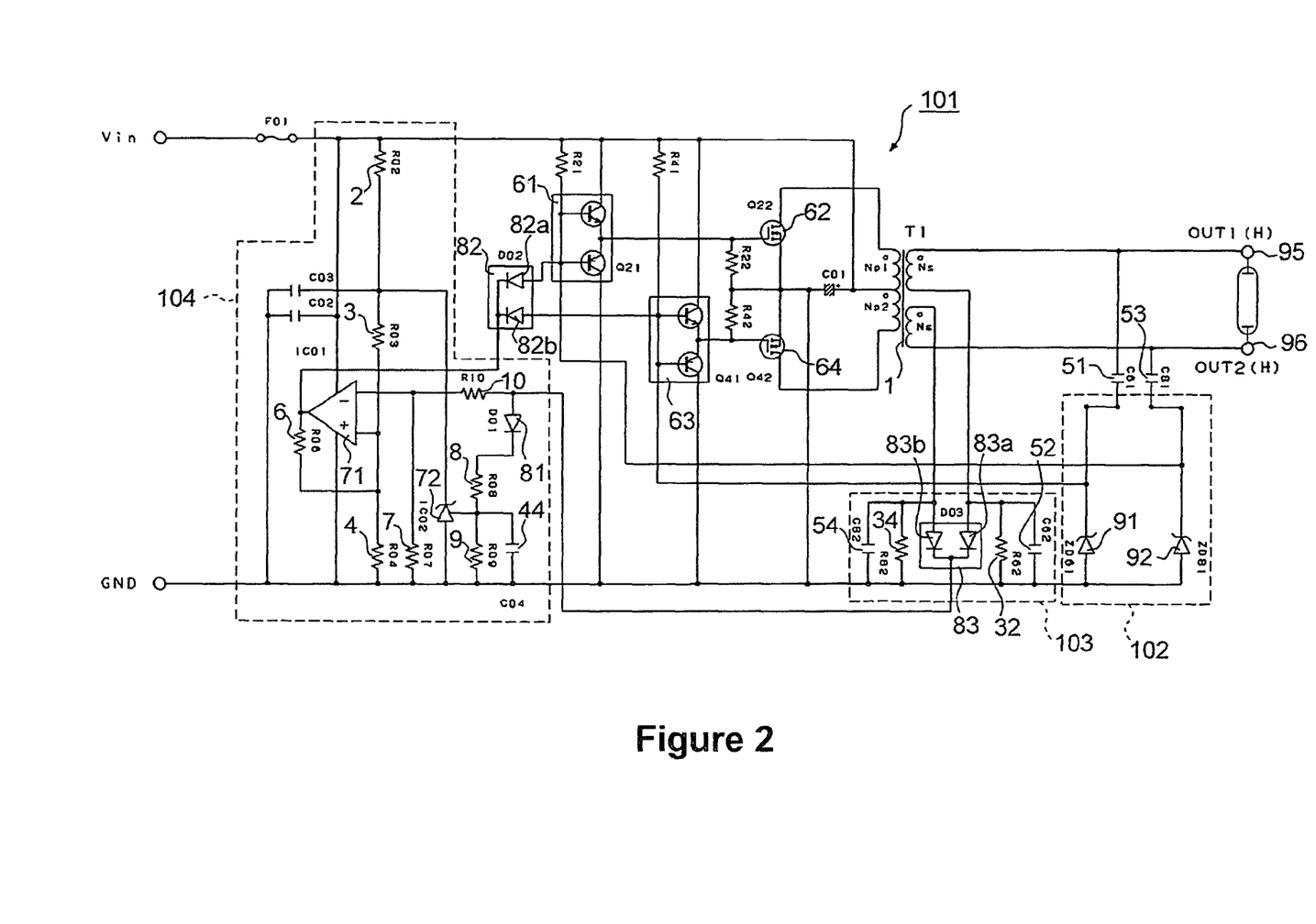
FIG. 2 is a diagram showing a first example of a specific circuit configuration of the self-excited inverter driving circuit in accordance with the embodiment of the present invention.

In particular, the control section 104 in the third configuration example uses an inverting differential amplifying circuit using an integration effect exerted by the comparator (IC03) 73 instead of the shunt regulator (IC02) 72 in the configuration example shown in FIG. 2.

Specifically, one end of the resistor (R08) 8 is connected to the cathode of the diode (D01) 81, while the other end of the resistor (R08) 8 is connected to the ground via the capacitor (C06) 46 and to the inversion input terminal of the comparator (IC03) 73.

Furthermore, three resistors (R13, R14, and R15) 13 to 15 are connected in series between a power supply line and the ground. The output terminal of the comparator (IC01) 71 is connected to the connection point between the resistor (R13) 13 and the resistor (R14) 14. The connection point between the resistor (R14) 14 and the resistor (R15) 15 is connected to the inversion input terminal of the comparator (IC03) 73. Thus, a part of the output from the comparator (IC01) 71 is fed back to the inversion input terminal of the comparator (IC03) 73. Consequently, even with a variation in input, a possible corresponding variation in output is inhibited, stabilizing the output.

The output terminal of the comparator (IC01) 71 is also connected to the pair diode (D02) 82 as in the case of the configuration example shown in FIG. 2.

Furthermore, four resistors (R18, R19, R11, and R12) 18, 19, 11, and 12 are connected in series between the power supply line and the ground. The connection point between the resistor (R11) 11 and the resistor (R12) 12 is connected to the non-inversion input terminal of the comparator (IC03) 73. A capacitor (C05) 45 is connected in parallel with the resistor (R12) 12.

Moreover, a cathode of a Zener diode (ZD1) 87 is connected to the connection point between the resistor (R19) 19 and the resistor (R11) 11. An anode of the Zener diode (ZD1) 87 is connected to the ground. Furthermore, the cathode of the Zener diode (ZD1) 87 is connected to one end of the resistor (R02) 2 the other end of which is connected to the non-inversion input terminal of the comparator (IC01) 71.

A predetermined voltage generated by the Zener diode (ZD1) 87 is divided by the two resistors (R02 and R04) 2 and 4, and the resultant voltage is applied to the non-inversion input terminal of the comparator (IC01) 71 as a reference voltage. Furthermore, the predetermined voltage generated by the Zener diode (ZD1) 87 is divided by the two resistors (R11 and R12) 11 and 12, and the resultant voltage is applied to the non-inversion input terminal of the comparator (IC03) 73 as a reference voltage.

Furthermore, the feedback resistor (R17) 17 is connected between the output terminal and inversion input terminal of the comparator (IC03) 73. An integrating capacitor (C07) 47 is connected in parallel with the feedback resistor (R17) 17 between the output terminal and inversion input terminal of the comparator (IC03) 73. The output terminal of the comparator (IC03) 73 is connected to the non-inversion input terminal of the comparator (IC01) 71. A capacitor (C08) 48 is connected between the output terminal of the comparator (IC03) 73 and the ground.

This circuit configuration allows the comparator (IC03) 73 to function as an inverting differential integrator.

That is, the comparator (IC03) 73 compares the pseudo triangular wave signal applied to the inversion input terminal by the triangular wave forming circuit 103 with the reference voltage for the non-inversion input terminal. The difference between the pseudo triangular wave signal and the reference voltage is inversely amplified and integrated under the effect of the capacitor (C07) 47. As a result, an integration DS signal is output. The output from the comparator (IC03) 73 is superposed on the reference voltage for the non-inversion input terminal of the comparator (IC01) 71 for application. That is, in other words, the voltage of the non-inversion input terminal of the comparator (IC01) 71 is proportional to the peak value of the output signal from the triangular wave forming circuit 103 as is the case with the use of the shunt regulator (IC02) 72 in FIG. 2.

The pseudo triangular wave signal from the triangular wave forming circuit input to the inversion input terminal of the comparator (IC01) 71 is compared with the voltage of the non-inversion input terminal. As a result, as is the case with the configuration example in FIG. 2, the comparator (IC01) 71 outputs the halt interval setting signal (see FIG. 5(*d*)).

Thus, the circuit section configured around the comparator (IC03) 73 acts substantially similarly to the shunt regulator (IC02) 72 in the configuration example shown in FIG. 2.

Therefore, for not only the operation of the control section 104 but also the operation of the whole self-excited inverter driving circuit, an operation similar to that described above with reference to FIG. 2 can be achieved. Thus, duplicate detailed descriptions are omitted.

Figure 4:
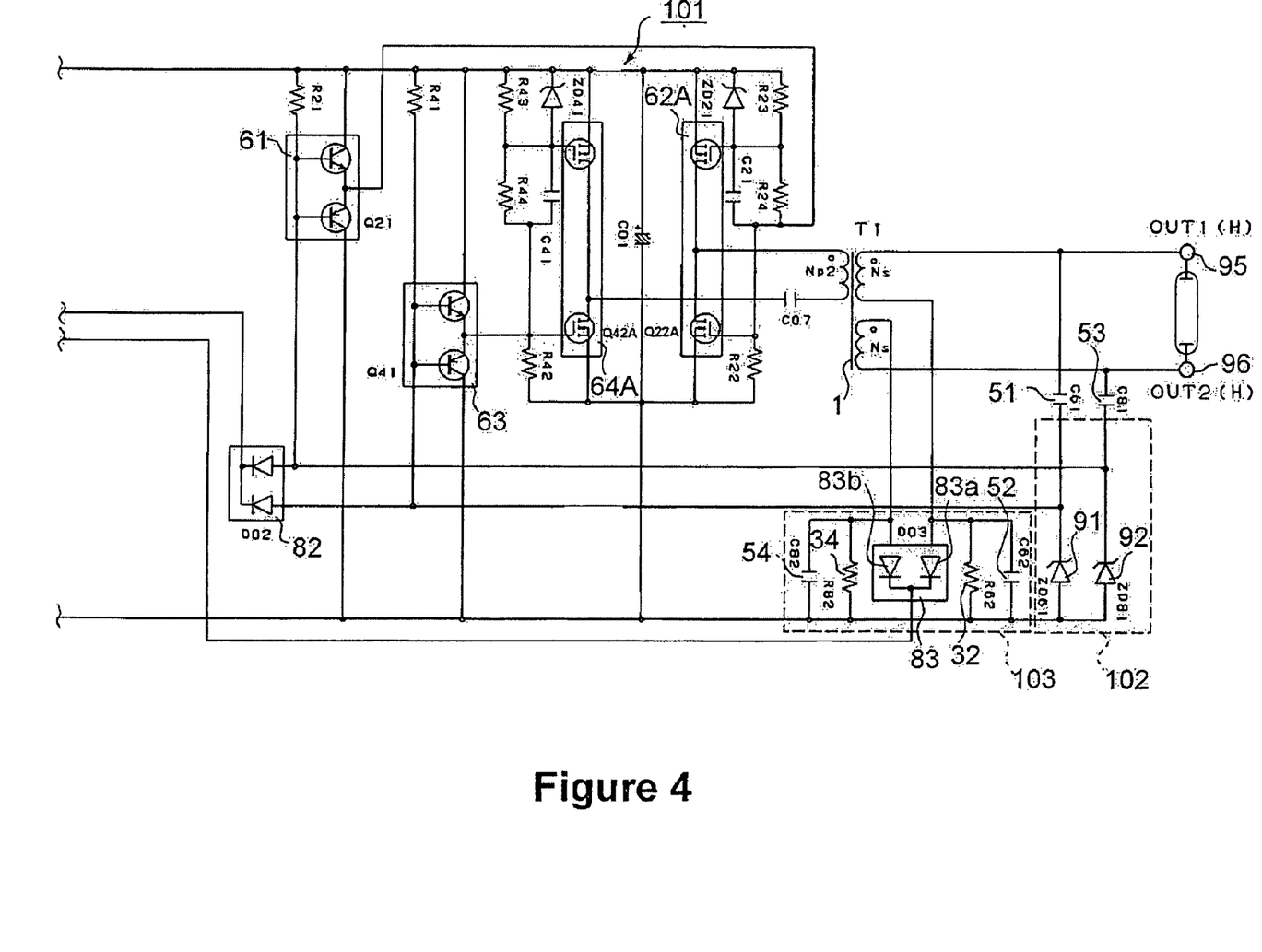
FIG. 4 is a diagram showing an example of a circuit configuration of a main inverter section in a third example of a specific circuit configuration of the self-excited inverter driving circuit in accordance with the embodiment of the present invention.

The third configuration example will be described with reference to FIG. 4. The same components as those shown in FIGS. 1 and 2 are denoted by the same reference numerals and will not be described in detail. The description below focuses on differences from the first example.

In the third configuration example, the main inverter section 101 is composed of a full bridge circuit instead of the push-pull connections shown above in FIGS. 1 and 2. The other circuit configurations are the same as those shown in FIGS. 2 and 3.

In the third configuration example, the full bridge circuit is composed of two CMOS FETs (Q22A and Q42A) 62A and 64A.

The outputs of the pre-drivers (Q21 and Q41) 61 and 63 are connected directly to gates of p-channel MOS FETs constituting corresponding CMOS FETs (Q22A and Q42A) 62A and 64A respectively. Thus, when the outputs from the pre-drivers (Q21 and Q41) 61 and 63 change to the level corresponding to the logical value Low, only the p-channel MOS FETs constituting the CMOS FETs (Q22A and Q42A) 62A and 64A become undrivable.

Except for the above-described points, the configuration of the full bridge circuit is well-known, and the detailed description thereof is thus omitted.

In this configuration, except that the full bridge circuit of the main inverter section 101 provides a high voltage output, the operation of the whole apparatus, composed of the resonance loop circuit 102, the triangular wave forming circuit 103, and the control section 104, is as described above and has no particular difference from the above-described configurations. Thus, duplicate detailed descriptions are omitted.

Figure 3:
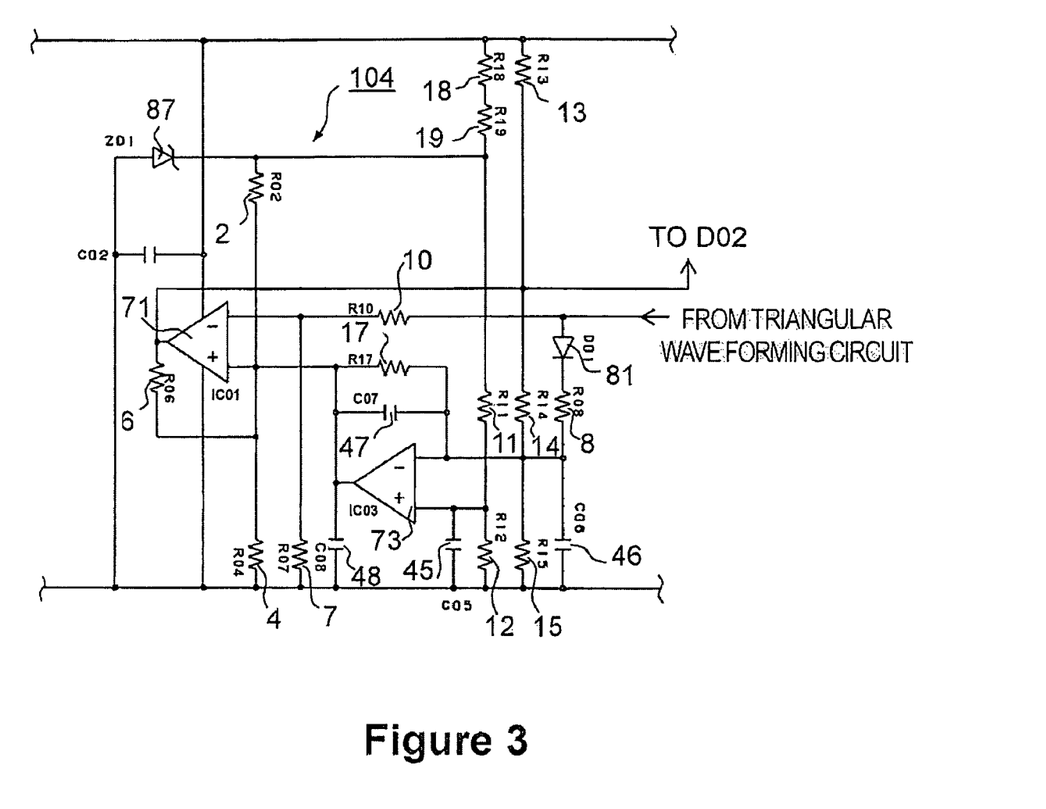
FIG. 3 is a diagram showing an example of a circuit configuration of a control section in a second example of a specific circuit configuration of the self-excited inverter driving circuit in accordance with the embodiment of the present invention.

In the third configuration example, the control section 104 may have the circuit configuration shown in FIG. 2 or 3. Furthermore, the main inverter section may of course be what is called a half bridge circuit instead of the full bridge circuit.

Table 1 shows the efficiency of the self-excited inverter driving circuit in accordance with the embodiment of the present invention measured in operation tests, together with the similarly measured efficiency of a conventional circuit. The efficiency is defined as (output power/input power)×100.

TABLE 1

|  | Input Voltage (V) | | |
| --- | --- | --- | --- |
| Efficiency (%) | 13.00 | 15.00 | 17.00 |
| Conventional Circuit 1 | 88.04 | 86.65 | 85.82 |
| Conventional Circuit 2 | 91.75 | 89.06 | 88.42 |
| First Configuration Example | 90.09 | 88.08 | 86.96 |
| Second Configuration Example | 90.09 | 88.08 | 86.96 |
| Third Configuration Example | 89.99 | 92.68 | 91.69 |

In Table 1, "Conventional circuit 1" means a conventional Royer circuit, and "Conventional circuit 2" means a conventional external-excited full-bridge inverter driving circuit. "First configuration example" means the configuration example shown in FIG. 2. "Second configuration example" means the configuration example shown in FIG. 3. "Third configuration example" means the configuration example shown in FIG. 4.

Table 1 indicates that the self-excited inverter driving circuit in accordance with the embodiment of the present invention exhibits improved efficiency almost comparable to that of the conventional external-excited full-bridge circuit, though the self-excited inverter driving circuit of the present invention may exhibit lower efficiency than the conventional external-excited full-bridge circuit depending on operational conditions.

The embodiment of the present invention provides a specific dimming condition without the need for what is called a dimming function. However, of course, the dimming function may be provided. Specifically, the dimming function can be provided by using an external control signal to forcibly set the inversion input terminal of the comparator (IC01) 71 at the level corresponding to the logical value Low to forcibly set the output from the control section 104 at the logical value High and varying the time period during which this operation is performed.

The pair diodes are not limited to those used in the above-described embodiment of the present invention but may of course be a combination of normal diodes.

The invention claimed is:

1. A self-excited inverter driving circuit that drives a discharge tube, wherein an output voltage of a resonance frequency of a resonance circuit comprising a leakage inductor and a capacitor on a secondary side of a high voltage transformer that is fed back to a switching element for self-excited oscillation, and
a resonance loop circuit configured to convert a secondary output of the high voltage transformer into a pulse signal of a fixed voltage and feed back the signal to an input side.

2. The self-excited inverter driving circuit according to claim 1, further comprising:
a triangular wave forming circuit that transforms the secondary output of the high voltage transformer into full-wave rectification to generate a pseudo triangular wave signal: and
a control section which compares an output from the triangular wave forming circuit with a DC reference voltage proportional to a peak value of the output from the triangular wave forming circuit and which generates a halt interval setting signal that halts an inverter operation for a predetermined interval on the basis of a result of the comparison.

3. The self-excited inverter driving circuit according to claim 2, wherein the control section is configured to use a shunt regulator or a comparator to provide a DC voltage proportional to the peak value of the pseudo triangular wave signal.

4. The self-excited inverter driving circuit according to claim 3, wherein
the high voltage transformer has two secondary windings, and the resonance loop circuit is configured so that a Zener diode converts a part of an AC output provided by each of the secondary windings into a pulse signal of a fixed voltage, and
the triangular wave forming circuit is configured to transform a part of the AC output provided by each of the secondary windings into half-wave rectification and to synthesize half-wave rectification outputs to provide a full-wave rectification output.

5. A self-excited inverter driving circuit comprising a plurality of switching circuits that perform a switching operation to generate an AC signal and a high voltage transformer connected to the switching circuits, an output terminal of the high voltage transformer being connected to discharge lamps, wherein:
the high voltage transformer has two secondary windings, and the discharge lamps are connected to high voltage side terminals of the two secondary windings, and the self-excited inverter driving circuit comprises a feedback section located on a low voltage side of a capacitor connected in parallel with the discharge lamps to feed back an output voltage of a secondary resonance frequency, and controls switching operations of the switching circuits on the basis of the secondary resonance frequency of the fed-back output voltage, and a rectifying circuit to form a triangular wave that is connected to a low voltage side terminal of at least one of the secondary windings in the high voltage transformer, the rectifying circuit forming the triangular wave of the secondary resonance frequency, comparing a signal level of the triangular wave with a signal level of the output voltage, and on the basis of a result of the comparison, setting a halt interval for the switching circuit.

6. The self-excited inverter driving circuit according to claim 5, wherein at most two comparators compare the triangular wave with the output voltage.

7. A self-excited inverter driving circuit having a resonance circuit comprising a leakage inductance and a capacitance of a high voltage transformer and providing a resonance frequency at which a discharge lamp is driven, wherein a halt interval for a switching circuit located on a primary side of the high voltage transformer is set based on (1) a triangular wave output from a low voltage side of a secondary winding in the high voltage transformer and (2) an output voltage fed from a low voltage side of a capacitor connected in parallel with the discharge lamp, back to a primary side of the high voltage transformer.

8. The self-excited inverter driving circuit according to claim 5, wherein at most two comparators compare the triangular wave with the output voltage.

* * * * *